US012735356B2

(12) United States Patent
Scarlata et al.

(10) Patent No.: US 12,735,356 B2
(45) Date of Patent: Sep. 15, 2026

(54) CHEMICAL ANALOGS OF CARBONIC ANHYDRASE FOR CONCRETE REPAIR

(71) Applicant: Worcester Polytechnic Institute, Worcester, MA (US)

(72) Inventors: Suzanne F. Scarlata, Worcester, MA (US); Ronald L. Grimm, Worcester, MA (US); Nima Rahbar, Weston, MA (US); Rebecca Gilchrist, Worcester, MA (US)

(73) Assignee: Worcester Polytechnic Institute, Worcester, MA (US)

( * ) Notice: Subject to any disclaimer, the term of this patent is extended or adjusted under 35 U.S.C. 154(b) by 988 days.

(21) Appl. No.: 17/943,559

(22) Filed: Sep. 13, 2022

(65) Prior Publication Data

US 2023/0105378 A1 Apr. 6, 2023

Related U.S. Application Data

(60) Provisional application No. 63/243,488, filed on Sep. 13, 2021.

(51) Int. Cl.

| | |
|---|---|
| ***C04B 24/40*** | (2006.01) |
| *C04B 103/00* | (2006.01) |
| *C04B 111/00* | (2006.01) |
| *C04B 111/72* | (2006.01) |

(52) U.S. Cl.

CPC ........ *C04B 24/40* (2013.01); *C04B 2103/002* (2013.01); *C04B 2111/00019* (2025.05); *C04B 2111/72* (2013.01)

(58) Field of Classification Search

None

See application file for complete search history.

(56) References Cited

FOREIGN PATENT DOCUMENTS

| | | | |
|---|---|---|---|
| CN | 109851304 | A | 6/2019 |
| CN | 111153675 | A | 5/2020 |
| WO | 2018156896 | A1 | 8/2018 |

OTHER PUBLICATIONS

Park et al. Biomimetics, 2019, 4, 66 (Year: 2019).*

Floyd, W. C. et al., "Evaluation of a carbonic anhydrase mimic for industrial carbon capture", Environmental science & technology, 2013, vol. 47, pp. 10049-10055.

International Search Report, PCT/US2022/043301, Dec. 27, 2022, pp. 1-4.

Park, D. et al., "Kinetic study of CO2 hydration by small-molecule catalysts with a second coordination sphere that mimic the effect of the Thr-199 residue of carbonic anhydrase", Biomimetics, 2019, vol. 4, No. 66, pp. 1-12.

* cited by examiner

*Primary Examiner* — Yun Qian

(74) *Attorney, Agent, or Firm* — Armis IP Law, LLC

(57) ABSTRACT

Methods and compositions are described for concrete repair using a non-naturally occurring or a synthetic catalyst. The catalyst includes an aromatic hydrocarbon having an active zinc ion configured to facilitate interaction between carbon dioxide and water and to precipitate concrete repairing calcium carbonate crystals. The catalyst is an analog of zinc cyclen, zinc and an indole-based molecule, and zinc tris(2-pyridylmethyl)amine (TPA).

12 Claims, 5 Drawing Sheets

Carbonic Anhydrase Mechanism

Carbonic Anhydrase Mechanism

CHEMICAL ANALOGS OF CARBONIC ANHYDRASE FOR CONCRETE REPAIR

RELATED APPLICATIONS

This application claims the benefit under 35 U.S.C. § 119(e) of U.S. Provisional application No. 63/243,488, filed Sep. 13, 2021, entitled "CHEMICAL ANALOGS OF CARBONIC ANHYDRASE FOR CONCRETE REPAIR", by inventors Suzanne Scarlata, Ronald Grimm, and Nima Rahbar, which is hereby incorporated by reference herein in its entirety.

BACKGROUND

Fixing decaying infrastructure involves disposing and replacing the existing structures, processes which generate heat and carbon dioxide ($CO_2$). Therefore, it is economical to repair rather than replace cracked structures. However, repair is a slow, exothermic process involving agents such as epoxies and microbes, and results in structures with reduced strength and reliability.

A method for repairing concrete is by biocalcification in which carbonic anhydrase (CA)-producing microbes are used to fill gaps, cracks and fissures in concrete. CA is a natural enzyme that is found in all living organisms, including humans. The CA enzyme catalyzes the reaction between calcium chloride ($CaCl_2$)) and carbon dioxide ($CO_2$) to produce calcium carbonate ($CaCO_3$). Calcium carbonate self-assembles on smooth and fractured cement paste surfaces to produce stable crystal structures that fills cracks with solid precipitate. However, use of bacteria or microbes to precipitate calcium carbonate requires subsequent sterilization by applying high-pressure steam or chemicals. Biological non-enzymatic approaches employing microorganisms such as bacterial spores are currently practiced, but such methods typically lack the speed and specificity of the CA enzyme, and a much greater amount of biomaterial must be consumed.

The use of bacteria to repair concrete structures which are in direct contact with humans, pose health risks. Existence of spores also creates unpleasant odor when not dormant that will always coexist with the structure. Therefore, methods of concrete repair by use of microbial CA create environmental and occupational hazards. Further, the bacterial method is slow, and lacks efficiency for repair of large cracks and pores.

Therefore, there is a need for a method of repairing cracks and fissures in concrete which utilizes alternatives for carbonic anhydrase enzyme.

SUMMARY

An aspect of the invention described herein provides a non-naturally occurring catalyst for concrete repair including: an aromatic hydrocarbon having an active zinc ion configured to facilitate interaction between carbon dioxide and water and to precipitate concrete repairing calcium carbonate crystals.

In an embodiment, the catalyst is at least one selected from: zinc cyclen, zinc and an indole-based molecule, and zinc tris(2-pyridylmethyl)amine (TPA). In an embodiment, the catalyst is an analog of at least one compound selected from: zinc cyclen, zinc with an indole-based molecule, and zinc tris(2-pyridylmethyl)amine (TPA).

An embodiment of the catalyst further includes a source of calcium ions, for example a calcium salt solution such as calcium chloride solution. An embodiment of the catalyst further includes a source of carbon dioxide. In some embodiments, the catalyst sequesters atmospheric carbon dioxide.

In some embodiments, the catalyst is configured to operate at a pH of 6.5 to 13. In some embodiments, the catalyst is configured to operate at temperatures up to 75° C. In some embodiments, the catalyst is configured to retain its catalytic activity for at least 1 year, at least 5 years, at least 10 years, at least 20 years. In some embodiments, the catalyst is incorporated with concrete.

In an embodiment, the catalyst is applied to concrete. In an alternative embodiment, the catalyst is incorporated in a calcium solution. In some embodiments, the catalyst sequesters atmospheric water.

An aspect of the invention described herein provides a method for repairing a concrete flaw, the method including: applying a synthetic catalyst to the concrete flaw; and covering the concrete flaw with a calcium solution, such that the synthetic catalyst precipitates calcium carbonate crystals to seal or repair the concrete flaw.

An embodiment of the method, further includes prior to applying, identifying a location of the concrete flaw. In an embodiment of the method, the synthetic catalyst is an aromatic hydrocarbon having an active zinc ion configured to facilitate interaction between carbon dioxide and water.

In an embodiment of the method, the synthetic catalyst sequesters carbon dioxide from atmosphere. In an embodiment of the method, the catalyst is at least one selected from: zinc cyclen, zinc and indole-based molecule, and zinc tris (2-pyridylmethyl)amine (TPA).

An aspect of the invention described herein provides a method for making a self-healing concrete, the method including: preparing a concrete mixture comprising cement, aggregates, and water; and mixing a synthetic catalyst and a calcium source to the concrete mixture; such that the synthetic catalyst precipitates calcium carbonate crystals to obtain a self-healing concrete.

DETAILED DESCRIPTION

Figure 1:
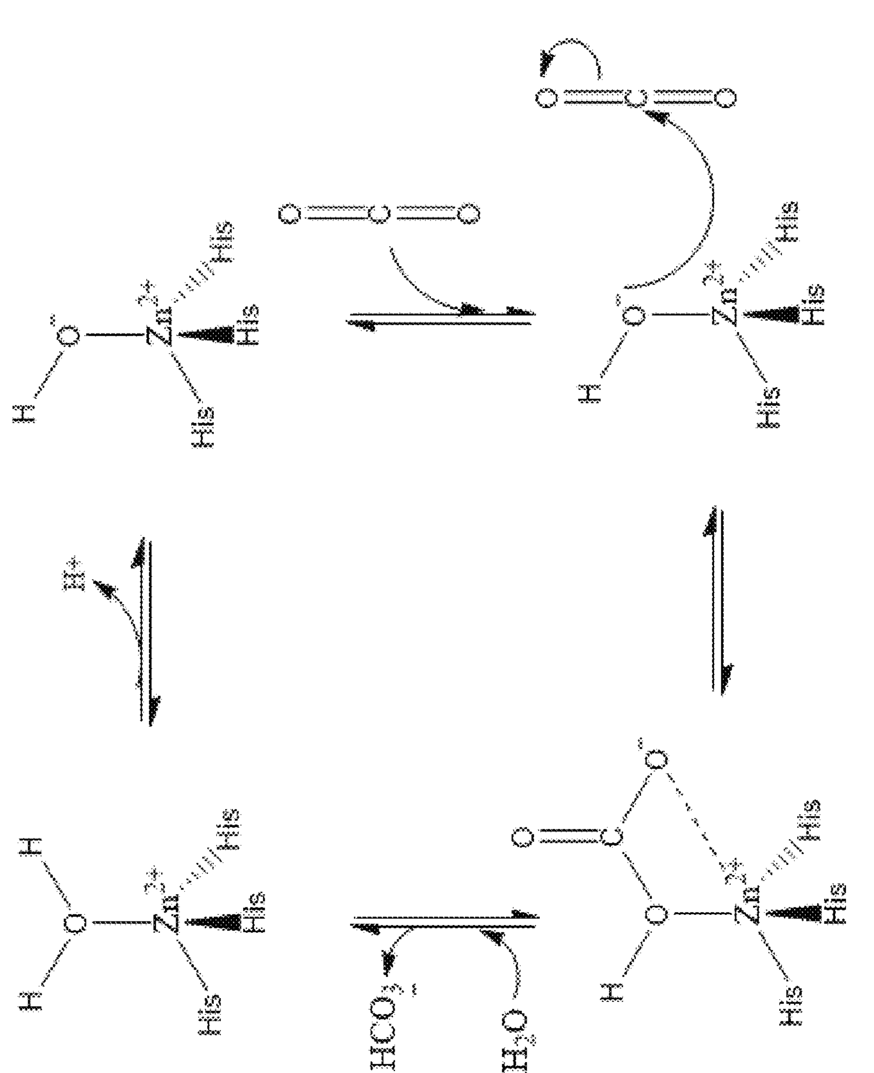
FIG. 1 is a schematic drawing of mechanism of action for a natural carbonic anhydrase enzyme or catalyst.
Figure 2:
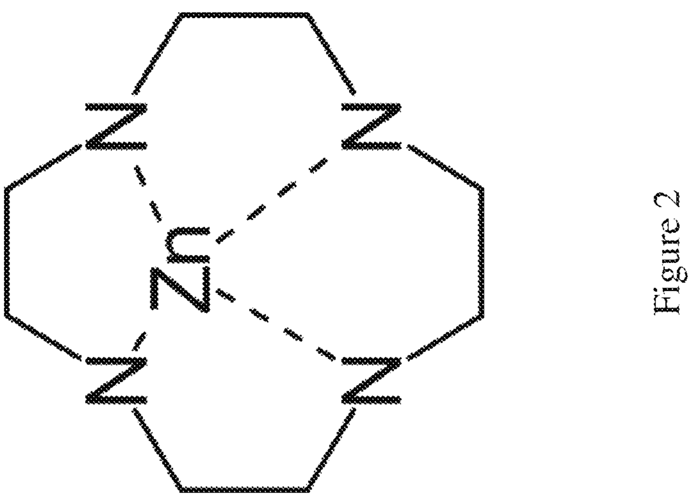
FIG. 2 is a chemical formula for a synthetic carbonic anhydrase, zinc cyclen.
Figure 3:
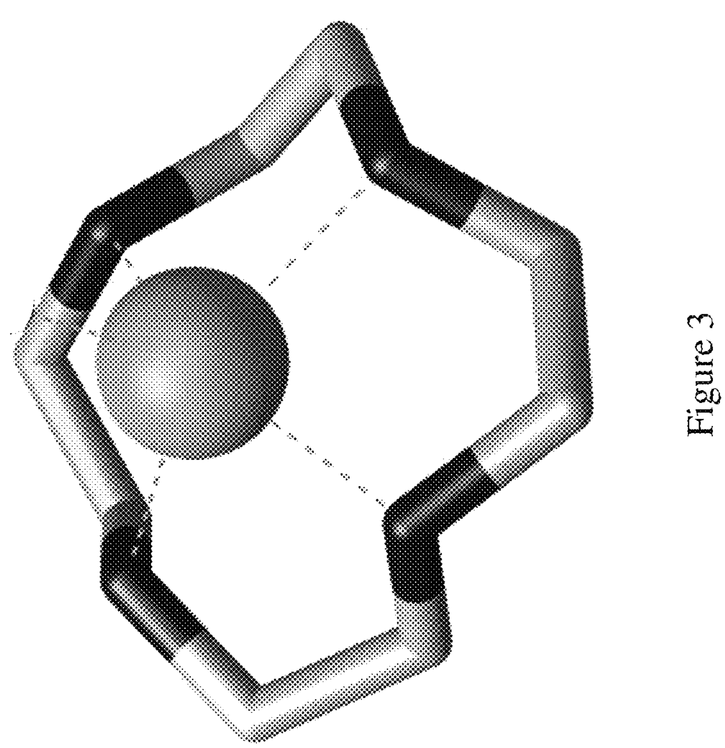
FIG. 3 is a crystal structure of zinc cyclen. The center sphere represents zinc which is attached to nitrogen molecules.
Figure 4:
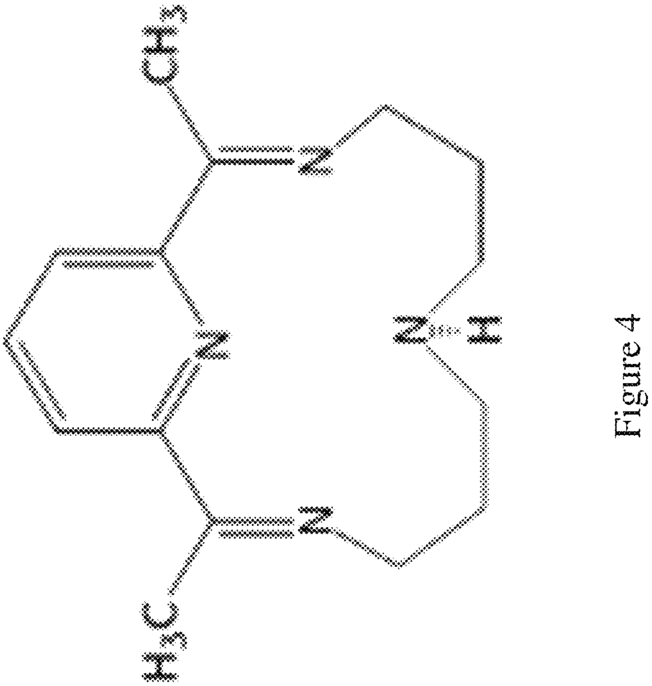
FIG. 4 is a chemical formula for an indole based synthetic carbonic anhydrase.
Figure 5:
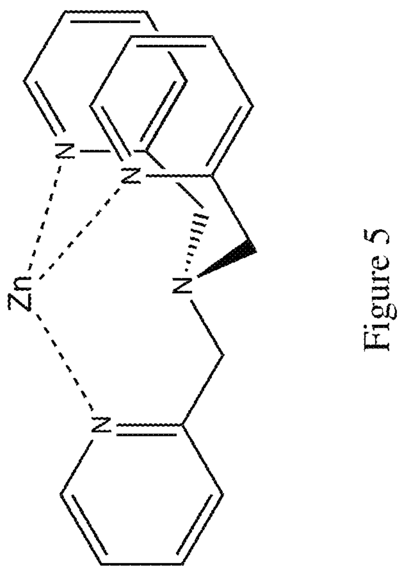
FIG. 5 is a chemical formula for a synthetic carbonic anhydrase, zinc tris(2-pyridylmethyl)amine.

Most infrastructure is composed of concrete and is the single most used material in the world. However, the use of concrete comes at an environmental cost. The production of concrete materials does not produce a large volume of carbon emissions by itself; however, its sheer volume is responsible for almost 8% of human made global carbon emissions, and 3% of global energy demand. Therefore, healing rather than replacing concrete offers a significant benefit to the environment. The inventions described herein present a new paradigm by introducing novel methods and compositions to naturally concrete which actively consumes $CO_2$ rather than generating $CO_2$.

The methods described herein present an enzyme-driven mechanism to repair cracked and damaged cement paste matrix that eventually results in a tougher and less permeable material. Biological enzymes are proteins that catalyze a chemical reaction at an extremely rapid rate without being consumed in the process and are inherently safe and reliable. The methods described herein use the carbonic anhydrase enzyme that is a natural enzyme found in all living organisms including humans. Carbonic anhydrase catalyzes the reaction between water, calcium ions ($Ca^{2+}$) and $CO_2$ to produce calcium carbonate ($CaCO_3$), which, self-assembles into a stable material that incorporates into the cement paste structure to fill the cracks. CA is the fastest known enzyme for this process and produces calcium carbonate at an exponential rate limited only by diffusion.

Contrary to other repair materials, such as organic epoxies, calcium carbonate is a material with similar thermal and mechanical properties to concrete or cement paste and produces a final product that has similar thermomechanical properties such as strength, modulus, and thermal expansion coefficient. The carbonic anhydrase method, therefore, results in a material with significantly improved mechanical properties over conventionally repaired material by removing the stress concentrations that arise from material dissimilarities. Because carbonic anhydrase is not consumed in the reaction, only a small amount is required. Further, the small size of the carbonic anhydrase molecule allows deep penetration in thick substrates.

Carbonic anhydrase is an enzyme that assists rapid interconversion of carbon dioxide and water into carbonic acid, protons and bicarbonate ions. The enzyme was first identified in 1933, in red blood cells of cows. Since then, it has been found to be abundant in all mammalian tissues, plants, algae and bacteria. The carbonic anhydrase enzyme has three distinct classes specifically, alpha, beta, and gamma. Members of these different classes share minimal sequence or structural similarity. However, carbonic anhydrases perform the same function and require a zinc ion at the active site.

Carbonic anhydrase (CA) from mammals belong to the alpha class, the plant enzymes belong to the beta class, and the enzyme from methane-producing bacteria that grow in hot springs forms the gamma class. Therefore, these enzyme classes have evolved independently to create a similar enzyme active site. The alpha enzyme is a monomer, and the gamma enzyme is trimeric. The beta enzyme is a dimer, however, there are four zinc ions bound to the structure indicating four possible enzyme active sites. Other members of this class form tetramers, hexamers or octamers, therefore dimers are likely a building block for the beta enzyme.

Mammalian carbonic anhydrases occur in about 10 slightly different forms depending upon the tissue or cellular compartment they are located in. These isozymes have some sequence variations leading to specific differences in their activity. For example, isozymes found in some muscle fibers have low enzyme activity compared to that secreted by salivary glands.

The pH of concrete is generally high and between pH 11.0 to pH 12.0. Carbonic anhydrase is observed to have an aggregation at acidic pH range from pH 2.0 to pH 5.0. The enzyme remains stable and maintains its secondary structure in the pH range, pH 7.0-pH 9.0. The ideal pH for maximum activity of the enzyme is pH 7.6. Therefore, carbonic anhydrase loses the catalytic activity or is unable to maintain the catalytic activity for an extended period of time at high pH. Because concrete has a high pH between pH 11.0 to pH 12.0, carbonic anhydrase does not remain stable and retain its catalytic activity in concrete for an extended period of time.

Another disadvantage of carbonic anhydrase is lack of long term stability and thermal stability. For example, carbonic anhydrase remains active only for few weeks and is stable at temperatures between 20° C. to 40° C. Further, CA is extracted from a living source such as mammals, plants or bacteria. Because the extraction process is complex, CA is expensive.

The inventions described herein are directed to chemical analogs of carbonic anhydrase enzyme or catalyst. The chemical analogs of carbonic anhydrase are synthetic preparations. In some embodiments, the chemical analogs of carbonic anhydrase are utilized for repairing holes or cracks in concrete. The chemical analogs of carbonic anhydrase utilize carbon dioxide, water, and calcium to form calcium carbonate. The calcium carbonate crystals precipitate and fill cracks in the concrete. The precipitation of the crystals results in a hard and solid material which is strong and heals upon repeated large-scale cracking by incorporating the synthetic enzymatic catalyst. The carbon dioxide may be utilized from the ambient air or from a dedicated source.

The synthetic carbonic anhydrase (CA) is stable at alkaline pH such as from pH 9.0 to pH 13.0. Therefore, the synthetic CA remains stable and retains its catalytic activity in concrete for an extended period of time, such as 1 year, 5 years, 10 years or 20 years. As a result, the synthetic CA has longevity with respect to catalytic activity and continues to heal concrete for an extended period of time. Further, because the synthetic CA is manufactured in a laboratory, it is relatively inexpensive and cheap.

The synthetic CA has long term stability at temperatures such as 50° C. and at 90% humidity. For example, the synthetic CA is stable for more than 1 year, 5 years, 10 years, 15 years, or 20 years. In some embodiments, the synthetic CA is attached to a substrate. For example, the synthetic CA is attached to silicon, zeolite, metal oxides, or silica particles.

Carbonic anhydrase is a zinc containing metalloenzyme. Therefore, the synthetic CA is also a zinc containing metalloenzyme. The synthetic CA mimics the reactions of natural CA.

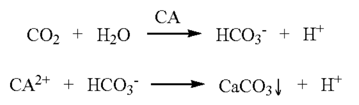

1

2

The carbonic anhydrase catalyzes a reaction converting $CO_2$ and water into carbonic acid, which dissociates into protons, and bicarbonate ions. The carbonic anhydrase catalyzes at a rate of 106 reactions per second. The enzyme contains a pocket of amino acids His94, His96, and His119 that hold a zinc ion. When a $CO_2$ enters the active site of the enzyme, it gains an OH— that was bonded to the zinc, forming carbonic acid that is then released. To replenish the OH—, water dissociates. The $OH^-$ ion binds to the zinc and the $H^+$ ion is released (FIG. 1). The reaction then repeats itself.

In some embodiments, the synthetic CA is a chemical and non-biological additive to promote waterproofing, repair and self-healing of concrete. The synthetic CA compounds have a central zinc ion chelated to a hydroxyl and 3 indole-based molecules which are either free or attached to a molecular cage with two polar sides that promote carbon dioxide entry and a polar side allowing water entry and $HCO^-$ release.

In an embodiment of the invention, the synthetic CA is a zinc cyclen, or zinc with an indole-based molecule, or zinc tris(2-pyridylmethyl)amine (TPA) as shown in FIGS. 2, 3, 4 and 5. In some embodiments of the invention, the synthetic CA is an analog of zinc cyclen or zinc with an indole-based molecule or zinc-(TPA). The synthetic CA is structured similar to natural carbonic anhydrase such as having a bowl-like structure and has an active zinc site which facilitates interaction between carbon dioxide and water. The Zn in the center of the bowl-like structure is a $Zn^{2+}$ ion. The Zn ion interacts with the water molecule and the oxygen in the water molecule interacts with the Zn ion. A carbon dioxide molecule also interacts with the Zn ion and the water molecule. The carbon in the carbon dioxide molecule is slightly positively charged thereby forming an interaction with the oxygen in the water molecule. The synthetic CA geographically places the water molecule and the carbon dioxide molecule to facilitate interaction thereby lowering barriers and promoting a bond between the carbon in the carbon dioxide and oxygen in the water molecule. The bond is formed, and a hydrogen is released as a proton from the water molecule thereby forming a bicarbonate ion. The calcium ions present in the concrete interact with the bicarbonate ion to precipitate as calcium carbonate crystals. The calcium carbonate crystals repair flaws or holes or cracks in the concrete and/or makes the concrete more durable and stronger.

In some embodiments, the synthetic CA is mixed with concrete to repair intrinsic flaws in the concrete thereby obtaining a self-repair concrete. In some embodiments, the synthetic CA is added to a calcium solution and applied to the concrete to repair visible flaws in the concrete or to increase durability of the concrete by repairing non-visible or intrinsic flaws in the concrete. The synthetic CA facilitates entry of reactants such as water and carbon dioxide and exit of products such as bicarbonate ion and proton. The calcium ions are sourced from an external source or are added to the concrete while preparing the concrete. In some embodiments, a calcium solution is applied to the concrete thereby providing water molecules and calcium ions. In some embodiments, water molecules are sourced from the atmosphere. In some embodiments, carbon dioxide molecules are absorbed from the atmosphere. Because carbon dioxide is consumed by the synthetic CA, the catalyst is carbon negative.

The inventions described herein are the most practical methods. It is recognized, however, that departures may be made within the scope of the invention and that modifications will occur to a person skilled in the art. With respect to the above description then, it is to be realized that the optimum dimensional relationships for the parts of the invention, to include variations in size, materials, shape, form, function, steps, and manner of operation, assembly and use, would be apparent to one skilled in the art, and all equivalent relationships to those illustrated in the drawings and described in the specification are intended to be encompassed by the present inventions.

The following examples and claims are illustrative only and not intended to be further limiting. Those skilled in the art will recognize or be able to ascertain using no more than routine experimentation, numerous equivalents to the specific procedures described herein. Such equivalents are within the scope of the present invention and claims. The contents of all references including issued patents and published patent applications cited in this application are hereby incorporated by reference.

The invention now having been fully described, it is further exemplified by the following claims.

What is claimed is:

1. A non-naturally occurring catalyst for concrete repair comprising:

an aromatic hydrocarbon having an active zinc ion configured to facilitate interaction between carbon dioxide and water and to precipitate concrete repairing calcium carbonate crystals; and a source of calcium ions, wherein the catalyst is at least one selected from: zinc cyclen, zinc and an indole molecule, and zinc tris(2-pyridylmethyl)amine (TPA).

2. The catalyst according to claim 1 further comprises a source of carbon dioxide.

3. The catalyst according to claim 2, wherein the catalyst sequesters atmospheric carbon dioxide.

4. The catalyst according to claim 1, wherein the catalyst is configured to operate at a pH of 6.5 to 13.

5. The catalyst according to claim 1, wherein the catalyst is configured to operate at temperatures of up to 75° C.

6. The catalyst according to claim 1, wherein the catalyst is configured to retain its catalytic activity for at least 1 year, at least 5 years, at least 10 years, at least 20 years.

7. The catalyst according to claim 1, wherein the catalyst is incorporated with concrete.

8. The catalyst according to claim 1, wherein the catalyst is applied to concrete.

9. The catalyst according to claim 1, wherein the catalyst is incorporated in a calcium solution.

10. A method for repairing a concrete flaw using the catalyst as in claim 1, the method comprising;

applying the catalyst to the concrete flaw; and covering the concrete flaw with a calcium solution, wherein the catalyst precipitates calcium carbonate crystals to seal or repair the concrete flaw.

11. The method according to claim 10 further comprising prior to applying, identifying a location of the concrete flaw.

12. The method according to claim 10, wherein the catalyst sequesters carbon dioxide from atmosphere.

* * * * *